(12) United States Patent
Howard (10) Patent No.: US 7,024,680 B2
(45) Date of Patent: Apr. 4, 2006

(54) METHOD AND APPARATUS FOR DETECTION AND CLASSIFICATION OF IMPAIRMENTS ON A RF MODULATED NETWORK

(75) Inventor: Daniel H. Howard, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 179 days.

(21) Appl. No.: 09/988,065

(22) Filed: Nov. 16, 2001

(65) Prior Publication Data

US 2002/0086641 A1    Jul. 4, 2002

Related U.S. Application Data

(60) Provisional application No. 60/249,111, filed on Nov. 16, 2000.

(51) Int. Cl.
*H04N 7/173* (2006.01)

(52) U.S. Cl. .......................... 725/107; 455/423

(58) Field of Classification Search ............... 725/107, 725/121–125; 455/67.11, 67.13, 67.15, 423, 455/424
See application file for complete search history.

(56) References Cited

U.S. PATENT DOCUMENTS 3,700,876 A * 10/1972 Gray ........................... 708/813
5,394,185 A     2/1995 Bernard ....................... 348/192
5,499,189 A *  3/1996 Seitz ............................ 700/286

6,385,773 B1 * 5/2002 Schwartzman et al. ..... 725/124

FOREIGN PATENT DOCUMENTS

EP    1 014 722 A2    6/2000

OTHER PUBLICATIONS

Ederling et al., "CATV Return Path Characterization for Reliable Communications", *IEEE Communications Magazine*, vol. 33, No. 8, dated Aug., 1995, pp. 62-69.
Copy of International Search Report issued Sep. 26, 2002 for International Appln. No. PCT/US01/43103, 7 Pages.

* cited by examiner

*Primary Examiner*—Lee Nguyen
(74) *Attorney, Agent, or Firm*—Sterne, Kessler, Goldstein & Fox, P.L.L.C.

(57) ABSTRACT

A method and apparatus for detecting and classifying RF impairments on the upstream path of a communication system is provided. The detection system detects frequencies with common path distortion impairments, and a system manager avoids transmission over those frequencies or adapts transmissions accordingly. Subsequently, periodic impairments on the upstream path are detected. Detection of periodic impairments triggers the system manager to schedule no traffic during impairment periods, schedule low priority traffic during impairment periods, and/or adjust the physical layer parameters of traffic transmitted during an impairment period in order to increase robustness only when necessary. Finally, non-periodic or random impairments are detected on the upstream path and global parameter changes are made to adapt to non-predictable impairments. Each of the impairment types is then further classified to assist an operator of the system in determining the physical source of the impairment.

24 Claims, 10 Drawing Sheets

FIG.4 SIMPLIFIED MODEL OF DOWNSTREAM FREQUENCY SPECTRUM ON CABLE PLANT

FIG.5 COARSE CPD FREQUENCIES FOR AN HRC PLANT

CPD COARSE FREQUENCIES FOR IRC PLANT

FIG.6

MEDIUM CPD FREQUENCY STRUCTURE FOR IRC PLANT FROM FCC OFFSETS OF 12.5 AND 25.0 kHz

FIG.7

MEDIUM CPD FREQUENCY STRUCTURE IN DETAIL ABOUT 18 MHz FOR IRC PLANT

METHOD AND APPARATUS FOR DETECTION AND CLASSIFICATION OF IMPAIRMENTS ON A RF MODULATED NETWORK

CROSS-REFERENCE TO RELATED APPLICATIONS

This application claims priority to the following provisional application: U.S. patent application Ser. No. 60/249,111, entitled "Method and Apparatus for the Detection and Classification of Impairments on an RF Modulated Network," filed Nov. 16, 2000, by Howard (still pending) (incorporated by reference in its entirety herein).

This application is related to U.S. patent application Ser. No. 09/574,558, entitled "Cable Modem Apparatus and Method," filed May 19, 2000, the content of which is hereby incorporated by reference.

BACKGROUND OF THE INVENTION

1. Field of the Invention

The present invention relates generally to telecommunications systems and, more particularly, to shared access RF networks.

2. Background

In conventional shared access communication networks, such as a hybrid fiber coaxial (HFC) network, a bidirectional communication path is maintained between a network headend and each remote point in the network. The communication path simultaneously carries broadband radio frequency (RF) signals in two directions on the same medium by dividing the frequency spectrum of the bidirectional communication path. Frequency division multiplexing (FDM) allows two or more simultaneous and continuous channels to be derived from a shared access transmission medium. FDM assigns separate portions of the available frequency spectrum to the "downstream" or "forward path" direction from a headend signal source to a plurality of remote points, and a second frequency range for carrying signals in the "upstream" or "return path" direction from each remote point to the headend.

For example, a conventional cable modem system provides a point-to-multipoint topology for supporting data communication between a cable modem termination system (CMTS) at a cable headend and multiple cable modems (CM) at the customer premises. In such systems, information is broadcast on downstream channels from the CMTS to the cable modems as a continuous transmitted signal in accordance with a time division multiplexing (TDM) technique. In contrast, information is transmitted upstream from each of the cable modems to the CMTS on the upstream channels as short burst signals in accordance with a time domain multiple access (TDMA) technique. The upstream transmission of data from the cable modems is managed by the CMTS, which allots to each cable modem specific slots of time within which to transfer data.

Conventional cable modem systems utilize DOCSIS-compliant equipment and protocols to carry out the transfer of data packets between multiple cable modems and a CMTS. The term DOCSIS (Data Over Cable System Interface Specification) generally refers to a group of specifications published by CableLabs that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. The most current version of the DOCSIS specification is DOCSIS 1.1, with DOCSIS 2.0 being the next planned version. In DOCSIS 2.0, advanced physical layer technology is added for which some of the benefits include more robust operation in impaired RF upstream channels.

One technical challenge in operating a network having a bidirectional communication path on a shared medium between the headend and each remote point is maintaining network integrity for signals transmitted in the forward path and return path directions. Noise and other undesirable energy originating at one remote point or at any point along the return path from that remote point can impair network communications for all remote points in the network. Similarly, where noise and undesirable energy from one remote point is combined with noise and or other RF impairments from other remote points in the network, network communications are impaired.

RF impairments occur in many forms including, but not limited to, impulse and/or burst noise, common path distortion, and ingress such as interference from radio communication and navigation signals. Impulse noise or burst noise consists of high-power, short-duration energy pulses. The high-power energy pulse results in a significant increase in the noise floor while the short duration results in an elusive disruption whose source or entry point into the network is difficult to pinpoint.

Ingress is unwanted energy that enters a communication path from a source external to the communication path. Ingress often comprises radio and/or navigational communication signals propagated over the air that enter a weak point in a wireline network, although it may also comprise impulse and/or burst noise that is similarly propagated over the air to enter the network at a weak point. Weak points in the network often occur where there is a shield discontinuity, improperly grounded electrical device, or a faulty connector at or near a remote point. When radio frequency carriers from shortwave radio, citizen's band radio, or other broadcast sources enter the network at these weak points, they cause interference peaks at specific carrier frequencies in the communication path.

Common path distortion is the result of second and higher order mixing products from the downstream channel that couple to the upstream channel and occur when physical electro-mechanical connectors corrode and oxidize creating point contact diodes. The effect of these diodes in the return path is additional interference that is generally narrowband at fixed frequencies spaced at regular 6 MHz intervals in the frequency spectrum.

Conventional mitigation techniques often adapt the signal via filtering, interleaving, coding, or spread-spectrum so that the capacity of the entire network is reduced to compensate for the interference. In addition, the adaptation of ingress filters may be complicated or corrupted by the presence of burst noise during the adaptation cycle. Similarly, system adaptation for periodic burst noise interference may be complicated or corrupted by an ingress talk spurt.

Furthermore, existing adaptations perform adaptation in a "blind" manner, in that the interference is not actually characterized. Rather, the adaptation is gradually increased in robustness until errors caused by the interference are eliminated. Because these adaptations often are performed only at the physical layer, the ability of a system manager operating at the link layer to characterize the status of the plant is greatly diminished. Further, there is no capability to intelligently choose which adaptation mechanism to use and how often to update the adaptation parameters. This results in less efficiency. What is needed, then, is a system and method to detect and characterize interference on a communications channel so that only necessary adaptation techniques are applied, and then in a manner that optimizes network efficiency for the required level of robustness.

BRIEF SUMMARY OF THE INVENTION

The method and apparatus of the present invention permits the detection and classification of impairments on a radio frequency (RF) modulated network. In accordance with embodiments of the invention, a system, such as a cable modem termination system (CMTS), detects an impairment on a communication channel of a communication system, such as a hybrid fiber coaxial (HFC) network. The CMTS characterizes the impairment and operating parameters of the communication system are adapted in accordance with the characterization of the impairment. For example, the CMTS may schedule data transmissions at a frequency without the impairment. Alternately, the CMTS may reduce the symbol rate of the transmissions and/or increase the error control coding in order to adapt to impulse impairments.

In embodiments, an impairment is detected by performing a time domain to frequency domain conversion on a signal associated with the communication channel. A signal magnitude is aggregated in the frequency domain, and the signal magnitude at a set of specified frequencies is compared with threshold values each associated with a frequency from the set of specified frequencies. A list of frequencies from the set of specified frequencies for which the signal magnitude of an individual frequency exceeds a threshold value associated with the individual frequency is reported.

In alternate embodiments, an impairment is detected by performing a time domain to frequency domain conversion on a signal associated with the communication channel. A signal magnitude is aggregated in the frequency domain, and the signal magnitude aggregated within specific frequency ranges is compared with threshold values each associated with a frequency range from the specified frequency ranges. A list of frequency ranges from the specified frequency ranges for which the signal magnitude of an individual frequency range exceeds a threshold value associated with the individual frequency range is reported.

In further embodiments, an impairment is detected by performing a time domain to frequency domain conversion on a signal associated with the communication channel. A pulse width and a time between pulses for the impairment signal within one or more frequency ranges is computed, either by using successive short duration time domain blocks to calculate the frequency domain as a function of time, or by selecting specific frequency ranges where desired and known ingress signals are not found, and reconverting the now filtered samples back to the time domain. A periodic impairment signal is then detected within the one or more frequency ranges.

In still further embodiments, an impairment is detected by examining data packets received from the communication channel, determining whether the data packets contain data errors, and detecting a period with which data packets containing data errors arrive from the communication channel. This process can involve either errors in the entire packet, or errors in specific packet components such as forward-error correction (FEC) blocks.

Embodiments of the present invention examine known frequencies for common path distortion impairments. In an embodiment, the detection of a common path distortion (CPD) impairment triggers a system manager to notify the user. In response, upstream transmissions on the communication system can be reassigned to new frequencies and/or other signaling parameters may be modified, such as symbol rate and FEC parameters.

Embodiments of the present invention also detect periodic impairments on a path of the communication system. In embodiments, the detection of periodic impairments triggers the system manager to schedule no traffic during impairment periods, schedule low priority traffic during impairment periods, and/or adjust the amplitude of traffic transmitted during an impairment period.

Embodiments of the present invention also detect non-periodic impairments on a path of the communication system. In embodiments, impulse and/or burst noise periodic and non-periodic impairments are classified to assist an operator of the system in determining the physical source of the impairment.

The described exemplary detection system uses a conversion process that maintains a power versus time characteristic of both impulse/burst noise as well as ingress and CPD interference so that power fluctuations are observed. An exemplary detection system calculates the rising and falling edges from an impairment pulse waveform and then calculates pulse widths as well as the time between pulses. In addition, an exemplary detection system calculates power fluctuations within pulses and between pulses. The described exemplary detection system further processes the pulse data to identify minimum pulse width, minimum time between pulse, frequency spectrum of individual pulses and maximum power fluctuation. The average time between pulses can also be determined from pulse repetition frequency (PRF) lines in the frequency spectrum. An exemplary detection system repeats the process for each ingress and/or CPD frequency discovered in band. The detection system preferably reports the overall minimum and maximum pulse widths, minimum and maximum time between pulses, and power fluctuation to the system manager for adaptation such as modifying the center frequency, signaling rate, FEC parameters, modulation order, or other signaling parameters.

A preferred embodiment of the present invention provides detailed characterization of the actual RF impairments present for more efficient adaptation and for reporting plant maintenance issues to operators of cable modem systems.

Further embodiments, features, and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

In the drawings.

The present invention will now be described with reference to the accompanying drawings. In the drawings, like reference numbers indicate identical or functionally similar elements.

DETAILED DESCRIPTION OF THE INVENTION

I. Overview

An exemplary embodiment of the present invention provides a method and apparatus for detecting and classifying RF impairments in a communication network, such as a shared access communication network. In an embodiment of the present invention the communication network is a cable modem system. In operation, an exemplary embodiment of the present invention first identifies unambiguous impairments and then systematically identifies remaining impairments.

In order to appreciate the advantages of the present invention, it will be beneficial to describe the invention in the context of an exemplary bi-directional communication network, such as for example, a hybrid fiber coaxial (HFC) network. Description in these terms is provided for convenience only. It is not intended that the invention be limited to application in this example environment. Based on the teachings provide herein, persons skilled in the art will be able to implement the invention in alternative environments.

II. Cable Modem System

Figure 1:
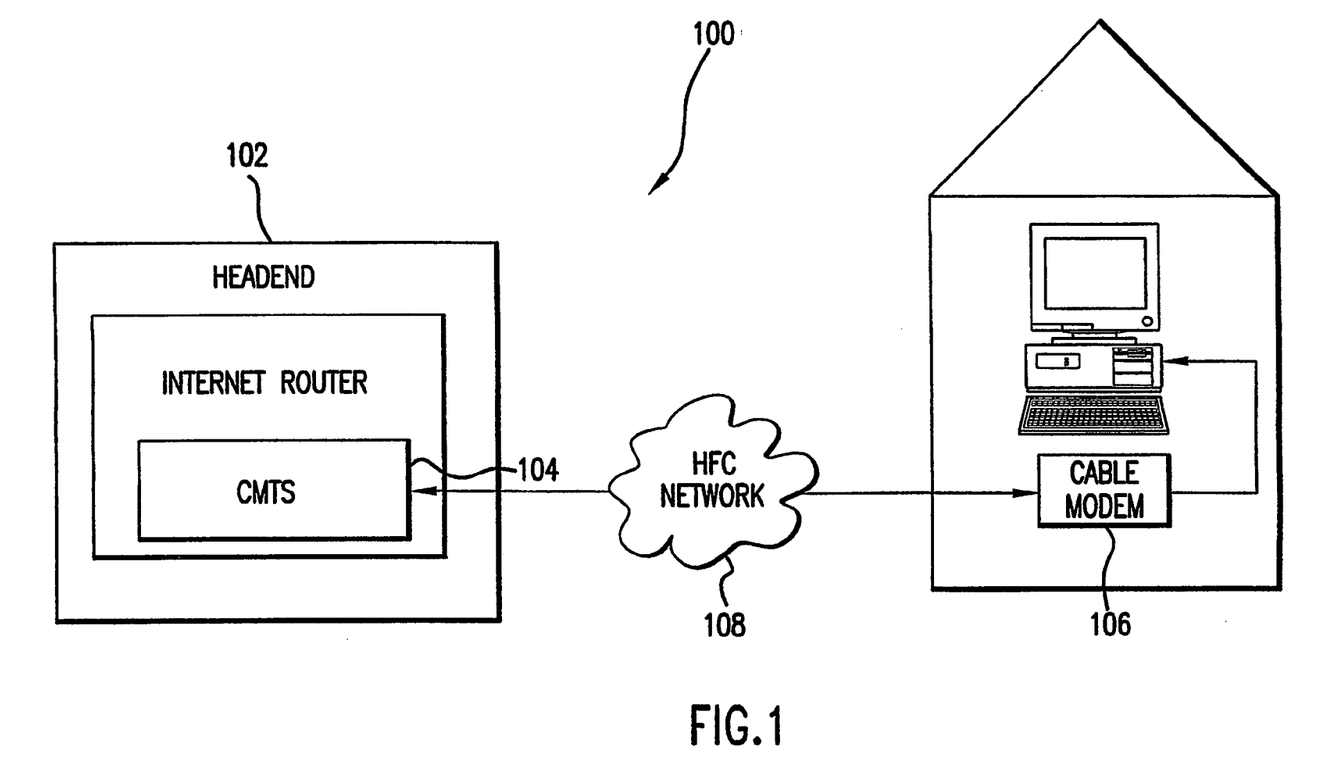
FIG. 1 is a block diagram of a cable modem system that includes an RF impairment detection system in accordance with embodiments of the present invention.

A block diagram of an example cable modem system in which embodiments of the present invention may operate is depicted in FIG. 1. An exemplary DOCSIS-compatible network 100 includes a headend 102 having a cable modem termination system (CMTS) 104 located at a cable company facility. The CMTS 104 functions as a modem that services a plurality of subscribers. Each subscriber has at least one customer premises equipment, such as a cable modem 106, connected to the CMTS 104 via a hybrid fiber coaxial (HFC) network 108. An exemplary CMTS for use with the present invention is disclosed in U.S. patent application Ser. No. 09/574,558, entitled "Cable Modem Apparatus and Method," filed May 19, 2000, which is incorporated by reference in its entirety.

III. Cable Modem Termination System

Figure 2:
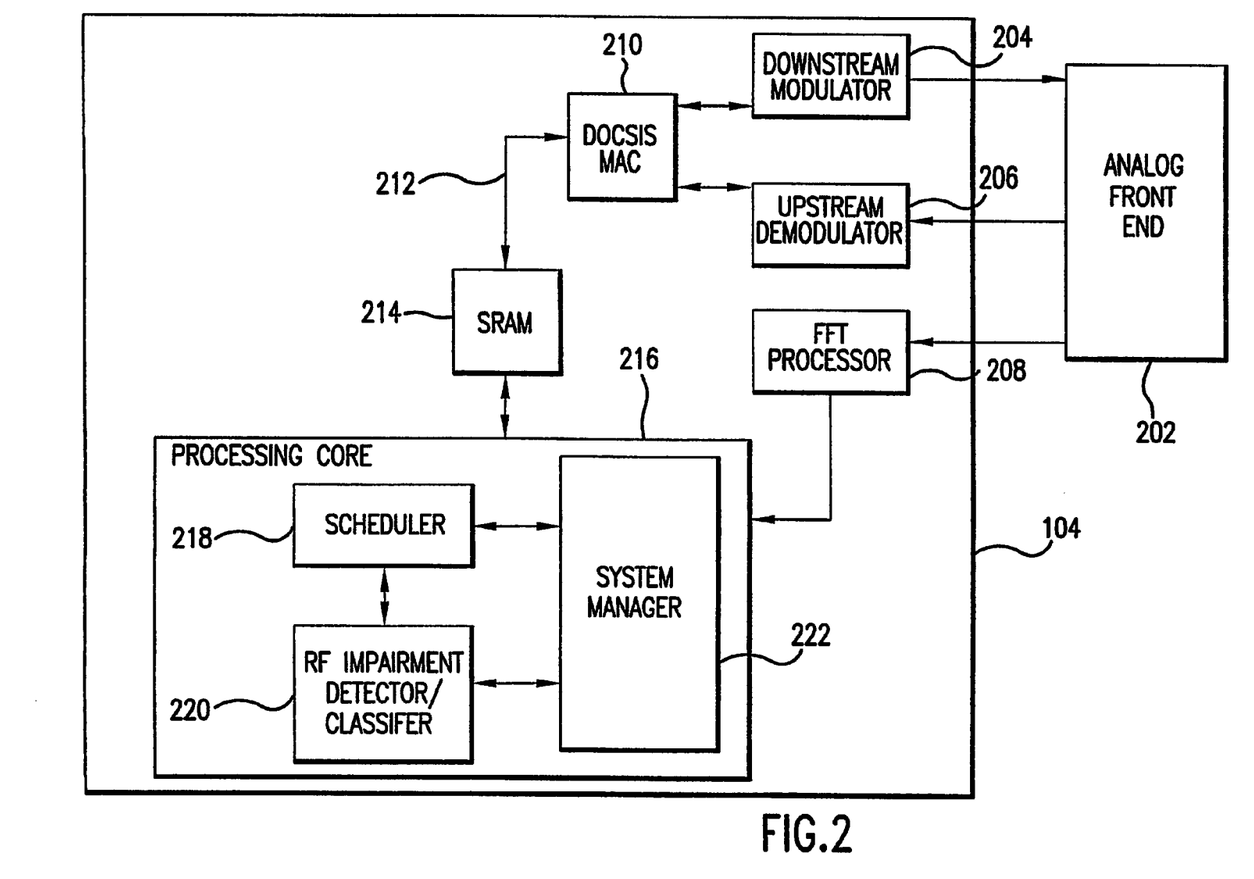
FIG. 2 is a block diagram of a cable modem termination system (CMTS) in accordance with embodiments of the present invention.

Referring to FIG. 2, the CMTS 104 includes a downstream modulator 204 for facilitating the transmission of data communications to a plurality of cable modems and an upstream demodulator 206 for facilitating the reception of data communications from the cable modems. On a given cable upstream channel, a plurality of RF impairments may simultaneously exist, including for example, common path distortion (CPD), periodic impulse/burst noise (PIB), and ingress. In operation, it is difficult to adapt ingress cancellation filters if burst noise is present during adaptation update cycles. Similarly, an ingress talk-spurt that turns on when the system is trying to identify or adapt to PIB noise may also make correction difficult.

Therefore, in accordance with embodiments of the present invention, the exemplary CMTS 104 includes a processing core 216, such as a MIPS core, that includes an RF Impairment Detector and Classifier (IDC) 220. The RF IDC 220 comprises a software module that identifies RF impairments on the upstream channel.

The exemplary CMTS 104 utilizes a burst receiver, rather than a continuous receiver, to receive time division multiple access (TDMA) data packets from cable modems via upstream communication channels. The burst receiver of the CMTS 104 comprises an analog front-end 202 having an analog-to-digital converter (not shown) that receives analog data packets from an upstream channel and converts the analog data packets into digital data packets. The upstream demodulator 206 amplifies the digitized data packets and demodulates the amplified signal with recovered clock and carrier timing. Matched filters and adaptive filters remove multi-path propagation effects and narrowband co-channel interference. An integrated decoder performs error correction and forwards the processed data in either parallel or serial MPEG-2 format to a DOCSIS media access control (MAC) 210. The DOCSIS MAC 210 extracts DOCSIS MAC frames from MPEG-2 frames, processes MAC headers, and filters and processes messages and data. Upstream data packets and message packets are then placed in system memory 214 via an internal system bus (ISB) 212.

The RF IDC 220 interfaces with a scheduler 218 and a system manager 222 which comprise additional software components within the processing core 216. The RF IDC 220 accepts data forwarded to system memory 214 by the upstream demodulator 206 and DOCSIS MAC 210 and, if available, Fast Fourier Transform (FFT)/time samples in implementations having an FFT/time sample block 208. The RF IDC 220 examines a variety of data including, but not limited to, forward error correction (FEC) errors, packets that contain errors, FFT output data, time sample data, and signal-to-noise (SNR) in order to identify when particular RF impairments are present. Based on the RF impairments detected, the scheduler 218 and the system manager 222 are supplied with data used to adapt the system operation to increase its robustness, efficiency, capacity, or any combination of these.

Although the above description is made with reference to a software system inside a processing core, one of skill in the present art will be able to construct the above system based on the disclosure contained herein in a number of ways including, but not limited to, hardware, firmware, software, or any combination of these elements. Additionally or alternatively, each or all of the impairments detected may be detected and characterized by multiple processors, hardware systems, or firmware systems, or any combination of these elements.

A. Common Path Distortion Detection System

Figure 3:
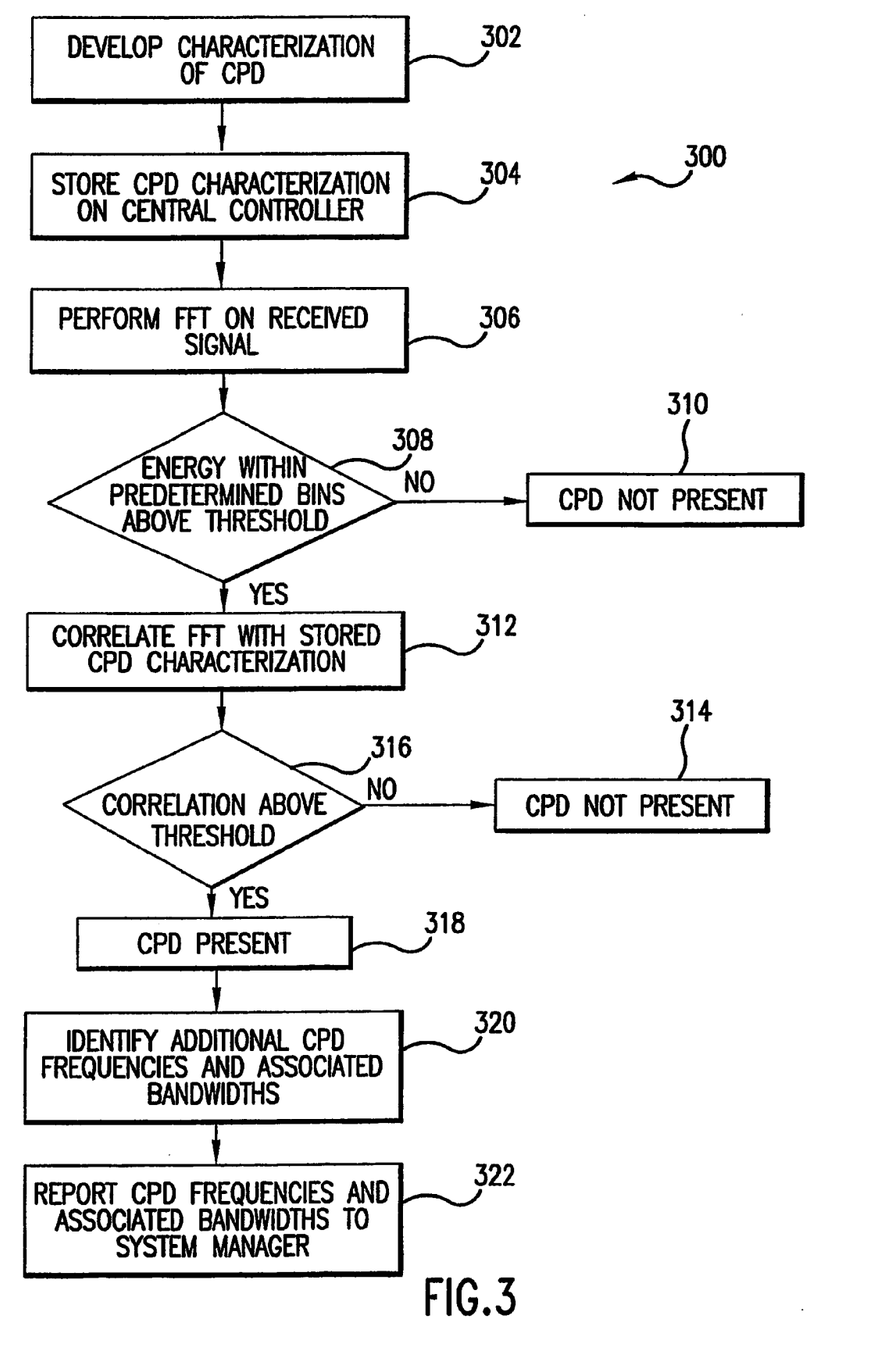
FIG. 3 is a flow diagram demonstrating the operation of a common path distortion (CPD) detection system in accordance with embodiments of the present invention.

Because common path distortion (CPD) is generally the most stable impairment in terms of both power and frequency, and because it is identified by specific, fixed-frequency components, a preferred embodiment of the present invention initially tests for CPD. A method 300 for identifying CPD is illustrated in FIG. 3. CPD verification begins with a characterization of the frequency spectrum resulting from second and third order mixing 302. This characterization uses the specification of the downstream spectrum to derive analytically the CPD spectrum which would result if CPD were present. An NTSC (National Television Standards Committee) downstream signal for example, has two main peaks, one at the video carrier and another at the audio carrier. The audio carrier signal has a smaller amplitude than the video carrier signal and has a frequency that is 4.5 MHz greater than the frequency of the video carrier. Thus, if $f_V$ is the frequency of the video carrier, the frequency of the audio carrier will be $f_A=f_V+4.5$ MHz.

Subsequent carriers for other downstream cable channels will generally be at $f_V+m*6$ MHz, $f_A+m*6$ MHz, where m=1, 2, 3, ..., within certain known frequency bands. The sum and difference frequencies, $f_j-f_i$, are used to determine the CPD frequencies that result from second order mixing products. Both positive and negative frequencies of the original spectrum are considered. The result of this computation is CPD beat frequencies at 6, 12, 18, ... m*6 MHz, with sidebands at +/−1.5 MHz around every 6 MHz beat.

Figure 4:
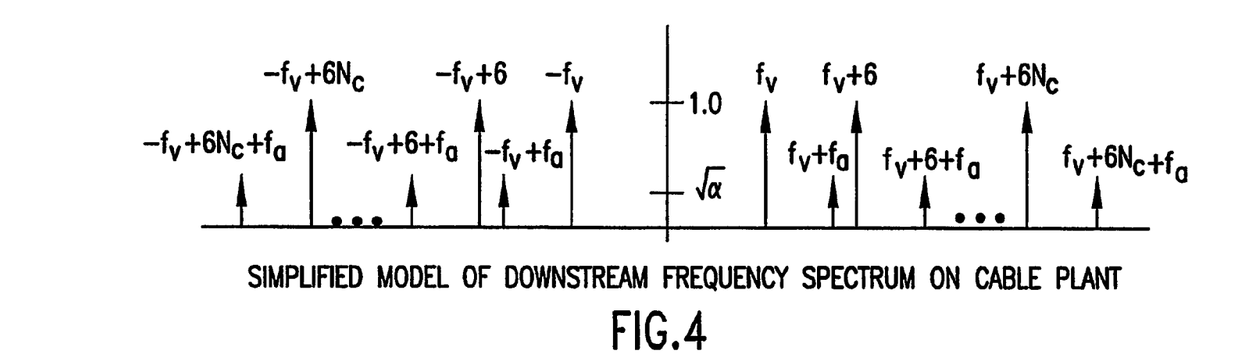
FIG. 4 illustrates a downstream frequency spectrum of an exemplary cable plant.

Thus, main, or coarse, CPD frequencies from second order mixing products in the upstream band exist at 6.0, 7.5, 10.5, 12.0, 13.5, 16.5, 18.0, 19.5, 22.5, 24.0, 25.5, 28.5, 30.0, 31.5, 34.5, 36.0, 37.5, 40.5, and 42.0 MHz. Because these CPD frequencies are invariant to downstream carrier shifts from harmonically related carrier (HRC), incrementally related carrier (IRC) or standard carrier (STD) plans, these frequencies will always be present when CPD exists. In an embodiment of the present invention, the relative amplitudes of the CPD frequencies are determined to provide greater detail in modeling and comparison to measurements by a formalism for the above computation. The formalism is based on the fact that multiplication in the time domain is equivalent to convolution in the frequency domain. Because the frequency domain representation of a real carrier at $f_V$ is $\frac{1}{2}[\delta(f+f_V)+\delta(f-f_V)]$, where $\delta$ is the Dirac delta function, if we represent the entire cable downstream spectrum as only the video and audio carriers, the normalized spectrum can be written as follows:

$$S(f)=\Sigma\{[\delta(f+f_i)]+\alpha[\delta(f+f_i+4.5)+\delta(f-f_i-4.5)]\}$$

where the summation goes from i=1 to $N_c$, $N_c$ is the number of downstream cable channels, $f_i$ is the $i^{th}$ video carrier frequency, $\alpha$ is the amplitude of the audio carrier relative to the video carrier (−8.5 dB). The frequency spectrum is graphically illustrated in FIG. 4 where a 6 MHz spacing between video carriers is assumed. In different downstream frequency plans, the spacing between video carriers is typically 6 MHz, but varies depending on the specific plan used on the cable plant. The second order mixing products are then determined by computing:

$$S_2(f)=S(f)*S(f) \text{ where * denotes convolution.}$$

In a further embodiment, a similar approach is used to derive the third order mixing products, with the result that additional frequencies at $2f_j-f_i$ and $f_j-2f_i$ are produced in the spectrum:

$$S_3(f)=S_2(f)*S(f)=S(f)*S(f)*S(f)$$

Figure 5:
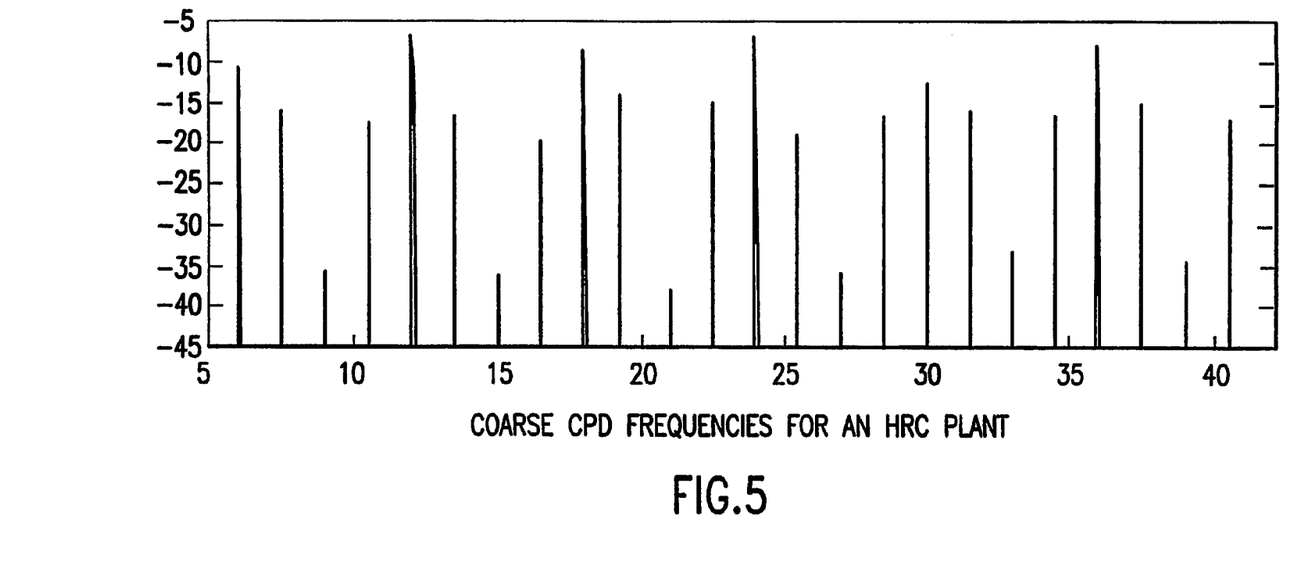
FIG. 5 illustrates a spectrum of main CPD frequencies for a harmonically related carrier (HRC) plant in accordance embodiments of the present invention.

For HRC systems, the additional frequencies due to third order mixing products are multiples of 1.5 MHz since the original carriers are at multiples of 6 MHz+either 0 or 4.5 MHz, and twice either the video carrier or the audio carrier minus another carrier still results in frequencies at increments of 1.5 MHz. FIG. 5 graphically illustrates a mathematically simulated frequency spectrum of second and third order CPD. The CPD frequencies at 9, 15, 21, 27, 33, and 39 MHz are solely due to third order products, while the remaining frequencies are due to both second and third order products.

Returning to FIG. 3, the simulated CPD characterization is stored on the CMTS, as shown in step 304, for correlation with received upstream signals. In operation, an exemplary embodiment of the present invention performs a Fast Fourier Transform (FFT) on the upstream band using the maximum record length, as shown in step 306. The described exemplary embodiment preferably coordinates with the scheduler 218 to collect samples during periods where there are no scheduled upstream transmissions.

The described exemplary embodiment examines the following frequency bins for energy, as shown in step 308: 6 MHz, 12 MHz, 18 MHz, 24 MHz, 30 MHz, and 36 MHz. In embodiments, each frequency bin may represent a single frequency or a range of frequencies. Neglecting frequencies in-band of cable modem or other known upstream signals (the frequencies are retrieved from the system manager 222), if the energy within more than one of the 6 MHz frequency bins is above a predetermined threshold, the system begins the process of verifying the presence of CPD on the upstream channel. This is accomplished by examining other predicted CPD frequencies and comparing measurements at these known frequencies. Otherwise, the detection system assumes CPD is not present on the upstream channel, as shown in step 310.

The exemplary method for identifying CPD correlates the FFT magnitude of bins above the predetermined threshold with the simulated frequency spectrum of the CPD, as shown in step 312, resulting from second and third order mixing shown in FIG. 5. In an embodiment, the correlation is not performed over the entire frequency range. For example, the correlation may be limited to a total shift of approximately 1.5 MHz minus the frequency bin width. In a further embodiment, the magnitude of each tone in the modeled frequency spectrum shown in FIG. 5 is set to unity to eliminate multiplication steps from the correlation process.

The correlation substantially reduces the mis-classification of energy in CPD frequency bins from burst noise as CPD. The correlation results in a large peak at zero shift and at multiples of 1.5 MHz, with much lower values at other shift values. The described exemplary embodiment reduces the time required to perform the correlation process by correlating only the frequencies at 6, 12, 18, 24, 30, and 36 MHz or the aforementioned frequencies with additional tones that are +/−1.5 MHz on either side.

In an alternate embodiment, the processing time for CPD detection is further reduced by reducing or eliminating multiplications from the correlation process and instead adding the magnitudes of a plurality of FFT bins, preferably about six, that are spaced 6 MHz apart. After adding the magnitudes of the plurality of FFT bins, each bin is shifted by one in the same direction and the process is repeated until a total range of either 1.5 MHz or 6 MHz is covered. Depending on which frequencies are examined, the correlation shift process may go from zero shift to 1.5 MHz, 6.0 MHz, or any higher frequency.

If the correlation at zero shift (and multiples of 1.5 MHz and/or 6.0 MHz if used) is large relative to other shift values, preferably in the range of four to six times the other shift values, an exemplary embodiment of the present invention determines that CPD is present on the upstream channel 318. Otherwise, the detection system determines that CPD is not present 314. One of skill in the art will appreciate that alternate representations of the CPD may be used to perform the correlation process to determine whether CPD is present. These alternate representations of CPD may be based on different plant frequency plans (e.g., HRC, IRC, or Standard), or on a reduced complexity model of the downstream to simplify correlation processing.

Figure 6:
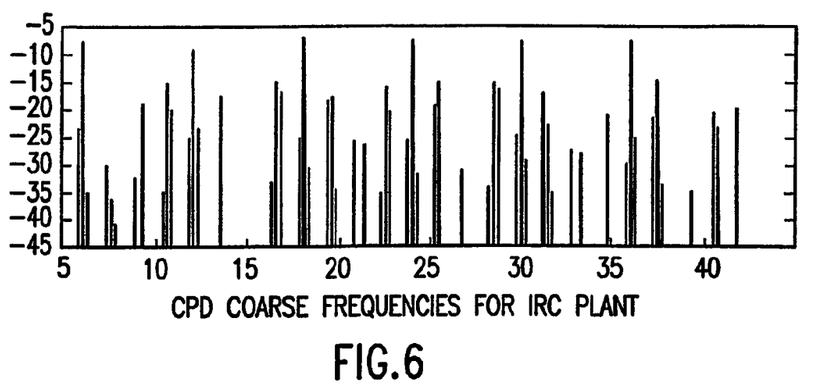
FIG. 6 depicts a spectrum of main CPD frequencies for an incrementally related carrier (IRC) plant in accordance with embodiments of the present invention.

For example, IRC plans have carrier frequencies which are offset by 0.25 MHz from those of HRC plans. While the offset does not affect the location of the second order mixing products, it does affect the location of third order mixing products. For example, in an IRC or Standard plant, the frequency of the audio carrier of Channel 19 is 151.25+ 4.5=155.75 MHz. Two times the frequency of the video carrier of Channel 4 is 2*67.25=134.5 MHz. The difference between the two is 21.25 MHz. Thus, referring to the CPD frequency spectrum of an IRC plant illustrated in FIG. 6, a key indication of whether the plant is HRC or Standard/IRC is the presence of CPD frequencies at X.25 MHz or X.75 MHz locations. Standard and IRC plans produce these coarse CPD frequencies, while HRC plans do not. This calculation can be performed in the CMTS in order to eliminate the need for entering actual downstream frequencies, or the plant frequency plan, into the CMTS during initialization. On the other hand, an embodiment which minimizes calculations in the CMTS involves the user entering the type of plant frequency plan (HRC, IRC, or Standard) into the CMTS so that the CMTS may determine which model of CPD spectrum to use in detecting the presence of CPD.

Returning to FIG. 3, an exemplary embodiment of the present invention examines additional frequencies based on the plant frequency plan (STD, IRC, or HRC) to further characterize the CPD frequencies that the system manager 222 should avoid when frequency hopping, as shown in step 320. This step is necessary since not all frequencies predicted by the model may in fact be strong enough to cause interference when CPD exists on a given plant. For example, the FCC requires cable operators to offset the carriers in certain bands by either 25 kHz or 12.5 kHz to prevent interference with aeronautical radio communications in those bands. The convolution of these carrier offsets result in additional CPD frequencies.

Second order difference frequencies between an offset carrier and a non-offset carrier produce CPD frequencies at 12.5 and 25 kHz offsets from the previously predicted frequencies. Third order offset products produce additional CPD frequencies at 37.5 kHz, 50 kHz, 62.5 kHz, etc. from the non-offset products. These third order offset products have lower amplitudes because the number of cable channels that are offset is less than the number which are not offset.

Figure 7:
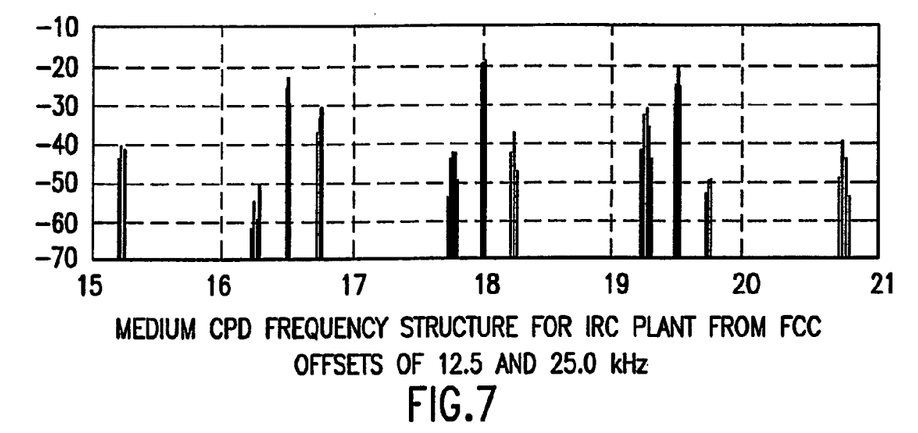
FIG. 7 illustrates a spectrum of main and sideband CPD frequencies resulting from the use of offset carriers in accordance with embodiments of the present invention.
Figure 8:
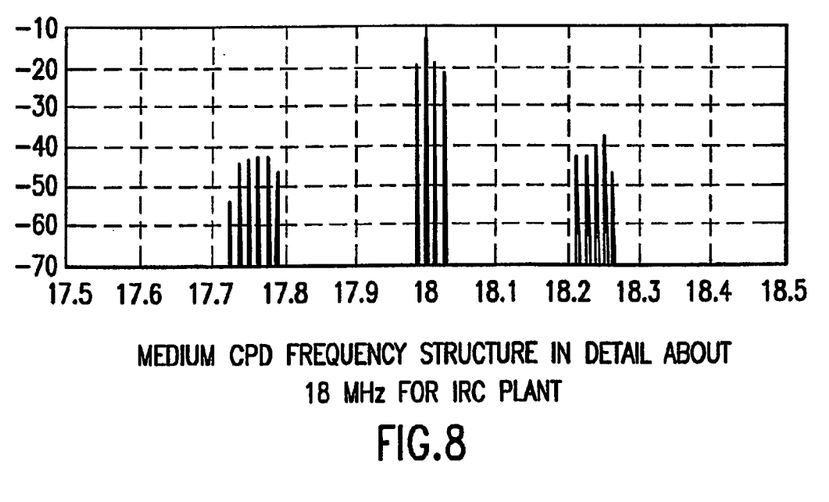
FIG. 8 illustrates a sideband frequency structure about a single main CPD frequency in accordance with embodiments of the present invention.

FIG. 7 graphically illustrates the CPD frequency spectrum with offset frequencies on an IRC plan. The coarse structure is substantially identical to that in FIG. 6. However, referring to FIG. 8, if a single 6 MHz channel, for example 18 MHz, is examined, the sidebands around each coarse CPD frequency are identified and, if desired, avoided. These offsets differ by either 12.5 KHz or 25 KHz from the nominal downstream frequencies.

Tables of plant frequency plans can be used to calculate the CPD spectrum. For example in the United States, the most common frequency plans are Standard (STD), incrementally-related coherent (IRC), and harmonically-related coherent (HRC). In other countries, other frequency plans may exist, and will lead to different CPD spectrum models; however the method for determining the CPD spectrum is identical to that presented here.

Further, it is possible to identify whether the CPD frequency spectrum results from a plant amplifier imbalance or from plant oxidation. For example, a plant amplifier imbalance results in third order mixing products dominating second order mixing products. This imbalance alters the relative strength of CPD frequencies with respect to each other. The measured CPD spectrum can thus be compared with simulated CPD spectra caused by plant oxidation. Thus, in an embodiment of the present invention, the source of the CPD spectra is determined by correlating the FFT results with simulated CPD spectra from causes of CPD including, but not limited to, plant oxidation and plant amplifier imbalance. In such an embodiment, adjustments based on the particular plant frequency plan (STD, IRC, or HRC) are incorporated into the simulated spectra as previously described.

One of ordinary skill in the art will appreciate that other methods that rely on examination of specific CPD frequencies produced by one cause of CPD, but not another, may also be developed. The disclosed method for distinguishing the separate causes of CPD is by way of example only and not by way of limitation.

Returning to FIG. 3, the detection system reports CPD frequencies and the likely cause of the CPD to the system manager 222 in the processing core 216, as shown in step 322. The present invention provides the scheduler 218 with the ability to avoid CPD frequencies when frequency hopping and allows the system manager 222 to notify the cable operator of the most likely cause of CPD.

In an embodiment, the FFT processor 208 may be part of the CMTS 104, as shown in FIG. 2. In an alternate embodiment, the FFT processor 208 is off chip from the CMTS system 104. However, if an FFT processor is not available, an alternate embodiment of the present invention determines that CPD is present on the upstream channel in accordance with the method illustrated in FIG. 9. The described method sets the symbol rate to a low level, as shown in step 902, for example in the range of about 160–320 ksymbols/sec in a DOCSIS compatible system, and scans the receiver through upstream frequencies, as shown in step 904. Because CPD frequencies are stationary with respect to time, typically on the order of minutes or even hours, the CPD spectrum (i.e., the energy captured in each upstream frequency to which the receiver is tuned) is aggregated over a period of time, preferably on the order of seconds or minutes. The detection system preferably scans for power/energy from the highest frequency bin to the lowest frequency bin. The detection system scans the receiver during periods of upstream inactivity to measure the energy at each upstream frequency, including both non-CPD frequencies, as shown in step 906, and CPD frequencies, as shown in step 908. The scanning algorithm and bin width may vary. For example, a stepped frequency with minimum symbol rate may be used. However, it will be apparent to one skilled in the relevant art that various scanning algorithms and bin widths may be used.

Figure 9:
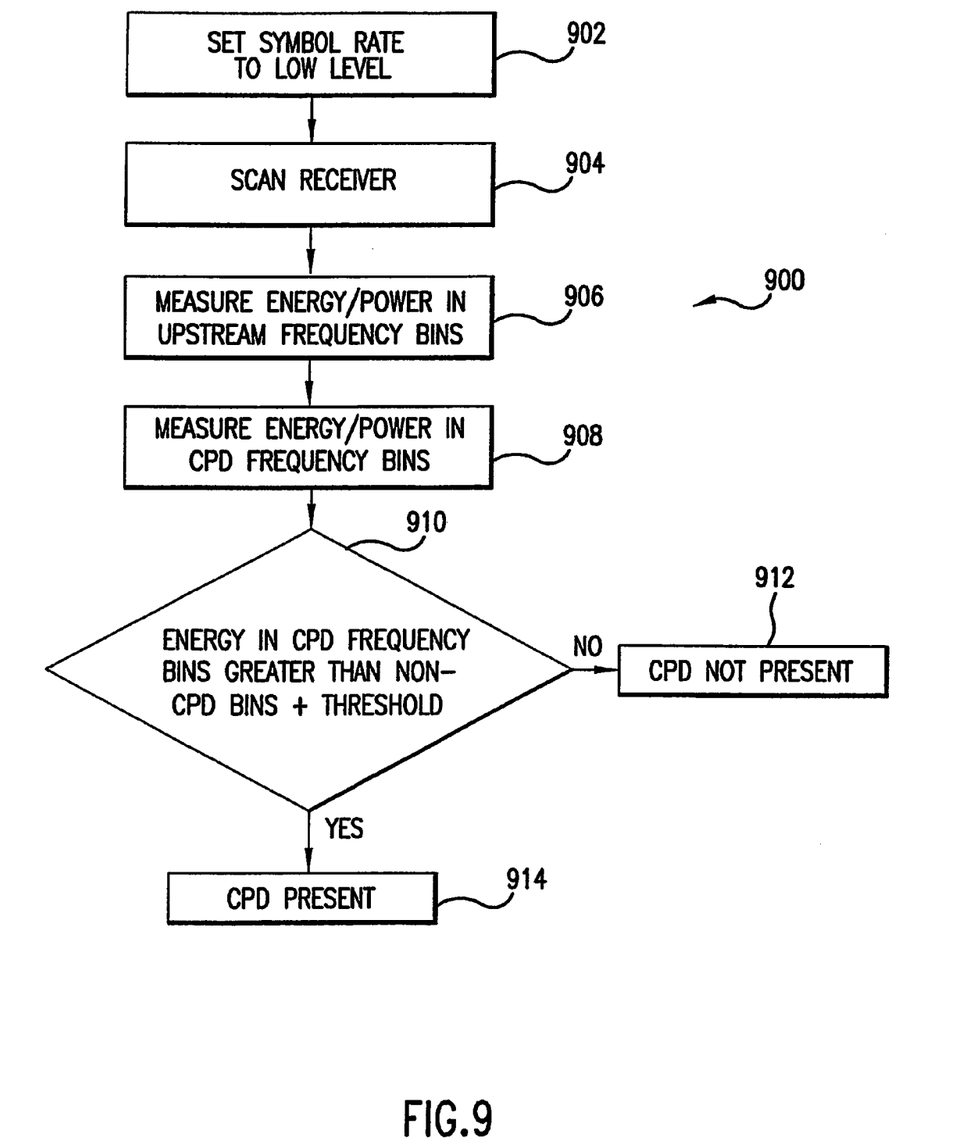
FIG. 9 is a flow diagram demonstrating the operation of a CPD detection system when the system does not use a frequency conversion process (e.g., a Fast Fourier Transform (FFT)) on measured data in accordance with embodiments of the present invention.

The CPD detection system compares the power/energy measurements in the key CPD frequencies at 6, 12, 18, 24, 30, and 36 MHz to the measured power/energy levels in other bins where CPD is not expected to occur, as shown in step 910 (as described above and further in Table 1). For example, in embodiments of the present invention, if the energy in the CPD frequency bins is four to six times greater than the energy in bins not associated with typical CPD tones for the particular frequency of the plant, the CPD detection system declares CPD present, as shown in step 914. Otherwise, the detection system determines that CPD is not present, as shown in step 912.

B. Periodic Impulse/Burst Noise Detection System

Figure 10:
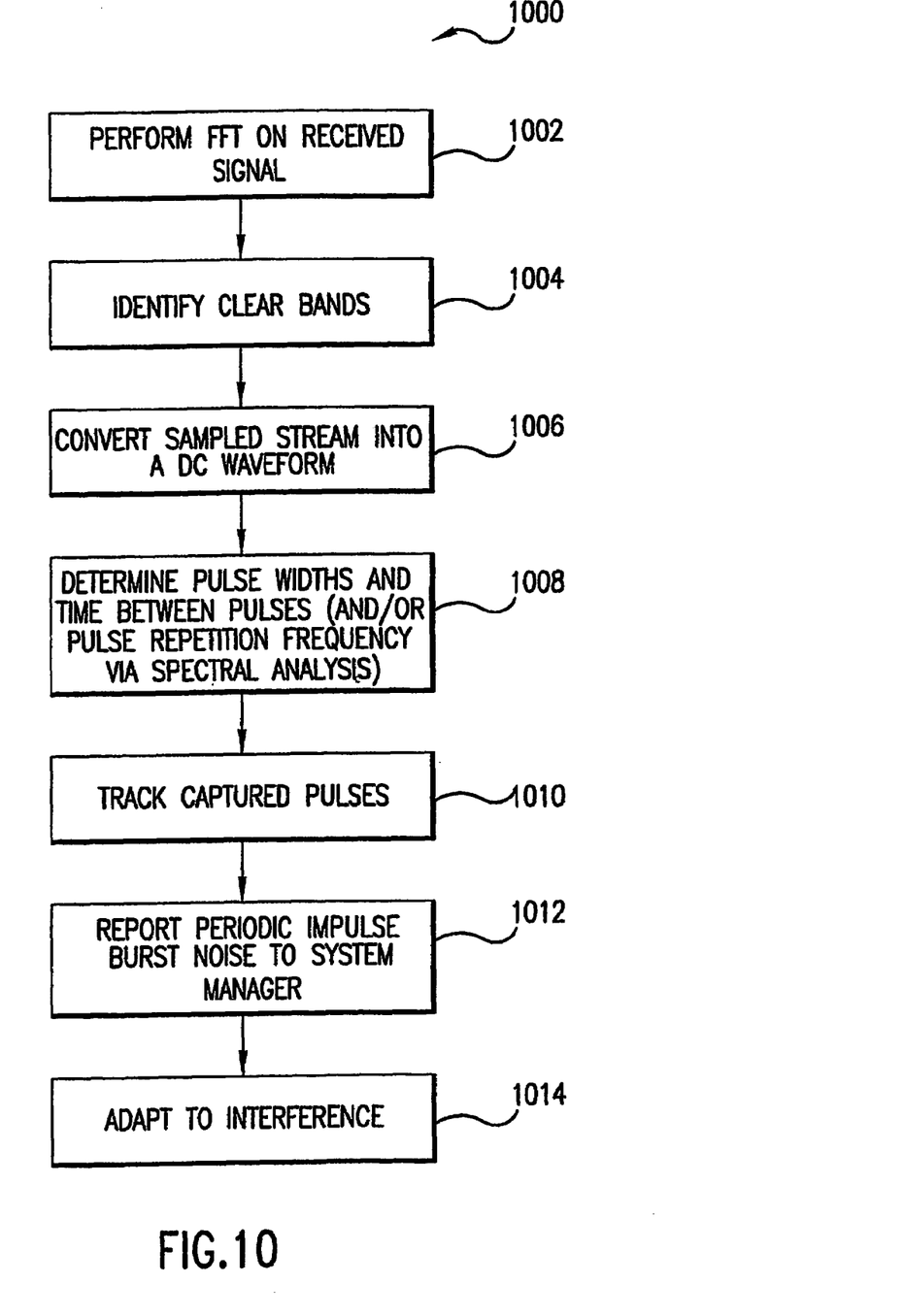
FIG. 10 is a flow diagram demonstrating the operation of a system for detecting periodic impulse/burst (PIB) noise in accordance with embodiments of the present invention.

FIG. 10 is a flow chart illustrating an exemplary method 1000 for detecting the presence of periodic impulse/burst noise (PIB) in accordance with embodiments of the present invention. The method 1000 permits further impairment detection processes to avoid scanning PIB when detecting and classifying ingress and updating and/or adapting an ingress cancellation filter. In accordance with the exemplary method 1000, an FFT of the entire upstream signal is used to gather the frequency spectrum from which PIB is detected, as shown in step 1002. The impairment detection system then identifies 'clear bands,' as shown in step 1004, which comprise frequency bands without ingress and without actual upstream communication signals. In an embodiment, the impairment detection system accesses an input data table of frequencies used by current upstream services to identify bands without upstream communications.

In further embodiments, frequency bands without ingress are identified by identifying contiguous frequency bins that have energy values less than a predetermined threshold. To minimize the impact of existing periodic impulse/burst noise, an exemplary detection system captures time samples using a revisit frequency that is not a multiple of 60 Hz. This prevents the possibility of capturing the same portion of a PIB waveform in successive captures, which could preclude detection of a PIB waveform.

In operation, an exemplary detection system that includes FFT processor capability utilizes a first clear band that is preferably less than about 20 MHz and on the order of at least 1.6 MHz wide. The detection system substantially reduces the sampling frequency to substantially increase the sequence length of the captured time samples from this band. In the described exemplary embodiment, the sample record length is preferably at least 20 ms. The exemplary detection system converts the sampled stream into a DC waveform, as shown in step 1006. In an embodiment, the detection system uses envelope power detection to convert the sampled stream. However, other techniques may be used to convert a stream into a DC pulse waveform as will be appreciated by persons skilled in the art. The detection system locates the rising and falling edges of the DC pulse waveform and calculates the pulse widths as well as the durations between pulses, as shown in step 1008. In an embodiment, the PIB detection system may choose to notify the CMTS of the PIB pulse width only if the detected width is well within the capability of the system to apply forward error correction (FEC) techniques to correct errors which result from the PIB interference. If the measured PIB pulse width is larger than what can be readily corrected, or if the system is set to optimize capacity of the network, the PIB system may be instructed to further characterize and track the PIB waveforms in order to schedule around the interference.

In an embodiment of the present invention, the detection system transmits additional captured samples to a microprocessor via a microprocessor interface. The additional captured samples are used to track pulses in the waveform. The microprocessor may utilize any one of a number of tracking techniques known in the art, including but not limited to early/late gate tracking from radar literature. New tracking techniques specific to CMTS-CM interactions are also possible by using minislot registration, FEC block numbering schemes, and the like, to track the captured pulses, as shown in step 1010.

However, if the maximum record length of the time samples is less than 20 ms, time-stamps of each time sample capture are preferably correlated with previous captures so that pulse width, pulse periods, jitter and other metrics can be calculated. Further, the time between captures may be specifically scheduled by the system manager 222 so that periodic captures out of phase with periodic impulse/burst noise are avoided.

For example, the described exemplary detection system may 'scan' the available time-slots in a periodic impulse train of period T with a maximum record length of time samples captured τ, and a minimum time between captures S. In operation, the detection system preferably examines time slots in the impulse train such that each time slot examined corresponds to a different position within the period of the impulse train of period T.

Figure 11:
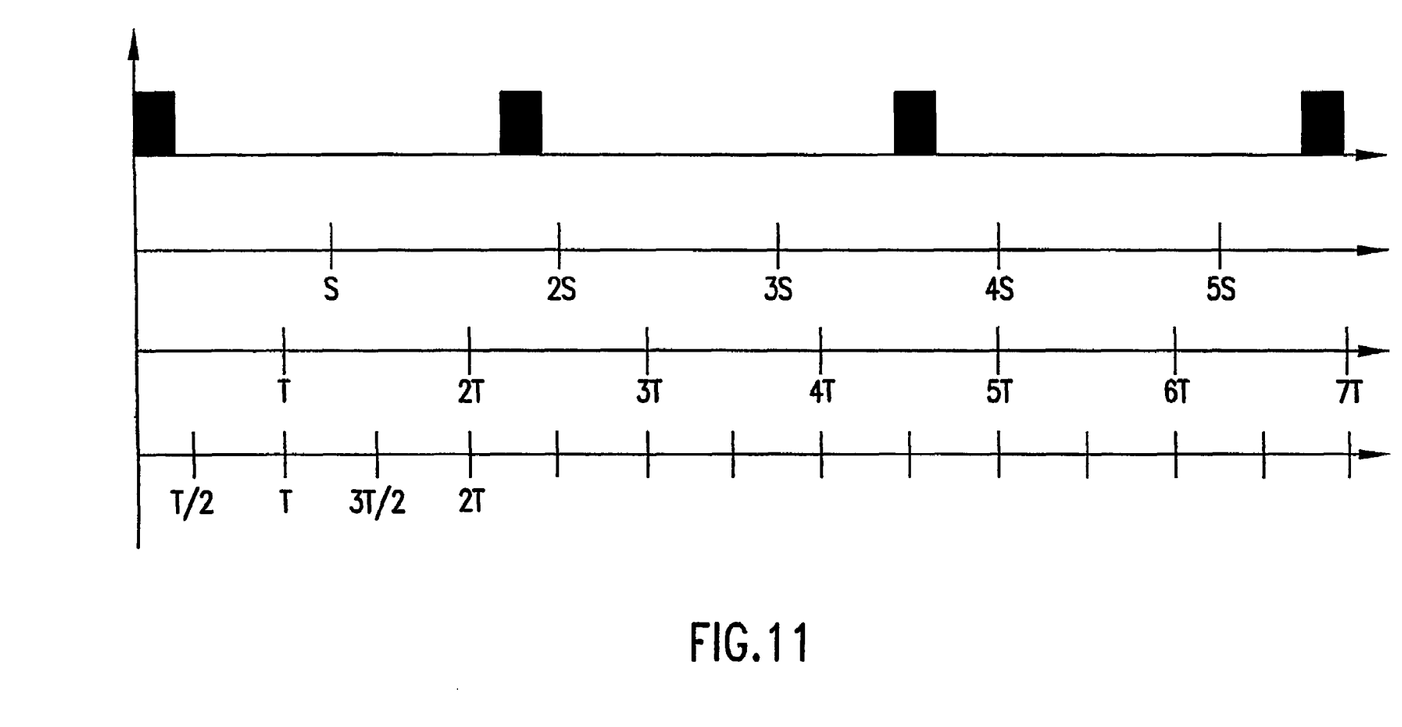
FIG. 11 illustrates capture intervals within an impulse train that are examined in a PIB detection system in accordance with embodiments of the present invention.

In an embodiment, if the initial capture is at a relative time of 0 sec, each successive capture is preferably at the ceiling $((S/T)*T+n\tau)$, where n is the index of each successive capture, and n=1, 2, 3, . . . . For example, referring to FIG. 11, the described exemplary detection system preferably examines successive time slots in the impulse train in a methodical manner. The black zones at the top of FIG. 11 are the capture intervals that are examined.

Another method that reduces the overall time to intercept of periodic impulse trains is to examine the next available opportunity (at time S). The detection system captures this time slot if the time slot corresponds to an unexamined portion of the impulse train period T. Alternatively, if the time slot does not correspond to an unexamined portion of the impulse train T, the described exemplary detection system preferably increments the time of capture by the time width of a capture and determines if this slot corresponds to an unexamined interval. In an embodiment, the system manager 222 calculates the start times of all slots within the period T (relative to a single period) and deletes start times from the table as they are examined. The system then moves to the next unexamined time-slot indicated by the table.

In both of these algorithms, each successive capture examines a different region of the period of the expected impulse train. Note that typical periodic impulse trains due to powerline phenomena have periods that conform to 1/m*60 sec., where m=1, 2, 3, . . . , such as 16.67 ms, 8.33 ms, and so on. Therefore, one approach is to choose the lowest harmonic frequency of impulse trains, or T=16.67 ms, for the period to be scanned in the algorithms above.

Another embodiment examines the FFT of the captured trace in detail at the lowest frequencies, or at harmonics of 60 Hz, and searches for pulse recurrence frequency (PRF) lines in the spectrum. This may be difficult if a diplexor filters out most of the spectral energy below 5 MHz; hence this technique may be better suited to detection of periodic impulse trains from military signals such as radar waveforms which have higher PRF's (tens or hundreds of kilohertz) and carrier frequencies which are about 5 MHz. Once the impulse train has been detected, the described exemplary detection system acquires the impulse train. In embodiments, the acquisition process uses the assumed lowest pulse recurrence interval of 16.67 ms for powerline phenomena, or 1/PRF for higher PRF waveforms detected via the aforementioned PRF method, and schedules captures at multiples of this period. The detection system classifies capture results by denoting an energy level above a threshold as "impulse detected". To further classify the impulse train, captures at multiples of twice the period and three times the period that do not overlap with multiples of the fundamental period are examined to determine if the periodic impulse train is at a frequency of 60 Hz, 120 Hz, etc.

An embodiment of the system takes into account the fact that occasionally impulses in the periodic train will either not be present, or be present at substantially reduced levels, and hence will continue the tracking process even when impulses expected to be detected are not seen. In such embodiments, the system keeps track of the number of consecutively missed periodic impulses and only after this number exceeds a predetermined threshold will the system declare that the periodic impulse train has disappeared.

Referring back to FIG. 10, the described exemplary detection system tracks the impulse train, as shown in step 1010. Tracking of the impulse train is accomplished via any number of traditional methods from Radar theory, one example of which is early/late gate tracking of range as described in *Introduction to Radar Systems* by Skolnik, Published by McGraw-Hill Higher Education, the content of which is incorporated herein by reference in its entirety. In alternate embodiments, methods based on clock recovery and tracking are used.

After detection and tracking, the described exemplary detection system preferably reports the presence of periodic impulse/burst noise to the system manager 222 for adaptation and/or avoidance in the time domain, as shown in step 1012. The report includes, for example, pulse widths, pulse width jitter, pulse period, and pulse period jitter. The system manager 222, in conjunction with the scheduler 218, avoids the interference, as shown in step 1014 by not scheduling any upstream transmissions during intervals when interference is expected. Alternately, lower priority transmissions are scheduled during expected impulse intervals. These transmissions are sent with increased robustness by, for example, being transmitted with a lower order of modulation and higher forward error correction (FEC)/interleaving.

Figure 12:
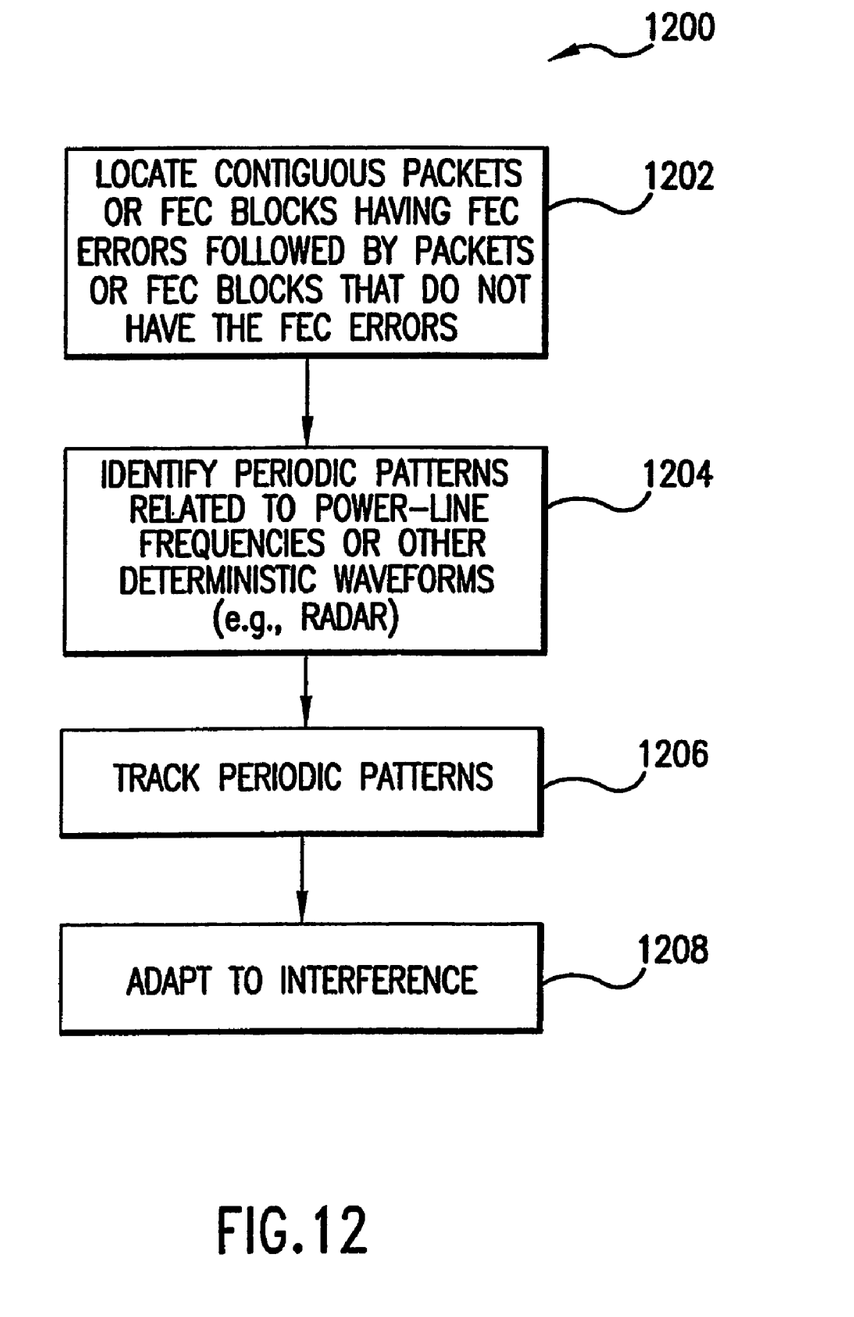
FIG. 12 is a flow diagram demonstrating the operation of a system for detecting periodic impulse burst noise in accordance with embodiments of the present invention.

An alternate embodiment for adapting to periodic impulse/burst noise indirectly ascertains the presence of noise via examination of FEC errors as a function of time. For example, uncorrected errored FEC blocks can be tracked by the receiver and kept track of for such purposes. Referring to FIG. 12, the system manager 222 preferably detects and analyzes the stream to locate contiguous groups of packets (or FEC blocks) on the upstream channel that have FEC errors followed by contiguous groups of packets (or FEC blocks) that do not have FEC errors, as shown in step 1202 The system manager 222 further analyzes the stream to determine whether this pattern repeats at periodic intervals related to power-line frequencies 1/60 Hz, 1/120 Hz, etc., as shown in step 1204. This determination can be made based upon timestamp information, or based on packet or FEC block sequencing/numbering which can be impressed on the packet or FEC block via other means or as a natural consequence of the application for which a packet is transmitted (e.g., voice over IP, or TCP connections with packet sequence numbers). As shown in step 1208, if the pattern is periodic, the system manager 222 and scheduler 218 avoid communicating in time-slots having FEC errors by using a tracking approach such as early-late gate tracking described above.

In an alternate embodiment, the scheduler 218 forms a null grant zone and shifts and/or expands and contracts the null grant zone in the time domain. When the FEC errors on incoming packets drop below a predetermined threshold, the impulse train has been detected, acquired, and tracked. The null grant zone is gradually narrowed and FEC robustness is increased for packets scheduled near the window if the system desires to increase throughput. As before, if the magnitude of interference permits, packets are scheduled during impulse intervals, albeit with greater robustness.

Furthermore, in some implementations of DOCSIS, altering the FEC, interleaving, and/or order of modulation on a burst by burst basis within the same Service ID (SID) is not possible. In these instances, the scheduler 218 preferably uses different SIDs or service flows, or logical channels (in DOCSIS 2.0) to differentiate traffic scheduled during impulse events and outside of impulse events. For example, in an embodiment, voice traffic with minimal FEC but lower required latency is scheduled outside of impulse intervals, while data traffic with higher FEC, interleaving, and lower order of modulation is scheduled elsewhere, including zones of impulse events. In an alternate embodiment, data traffic is scheduled during non-impulse events, while voice traffic with heavy FEC, interleaving, and low order of modulation is scheduled during impulse events. In embodiments, the choice may depend on one or more factors, including but not limited to the magnitude of impulse interference, the duty cycle of interference (pulse width $\tau$ divided by the pulse period T), the size of voice and other short packets such as TCP ACKs (acknowledges) versus data packets, and the maximum order of modulation permitted in clear zones.

Finally, in an embodiment, the system first detects and tracks all periodic impulse/burst noise which is present and continues to search for impulse/burst noise, and whenever detected impulse/burst noise does not fit into current tracked waveforms, the system classifies this noise as random and keeps track of all randomly detected events so that overall FEC, interleaving, packet size, and other signaling parameters under the control of the CMTS may be altered on a global scale to account for random noise events which cannot be tracked.

C. Ingress Detection System

Figure 13:
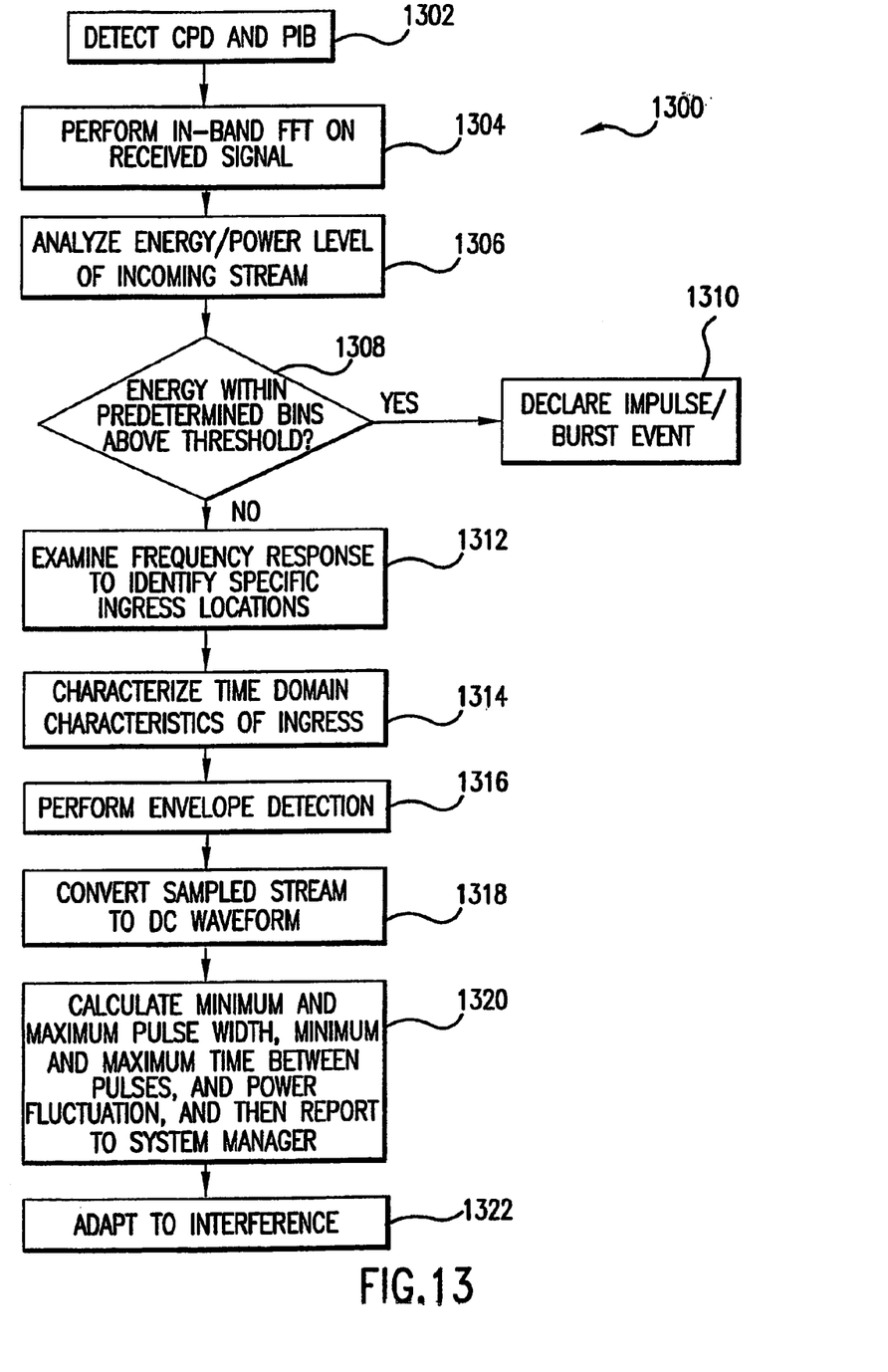
FIG. 13 is a flow diagram demonstrating the operation of a system for detecting ingress in accordance with embodiments of the present invention.

Referring to FIG. 13, the described exemplary detection system preferably detects and tracks ingress after CPD and periodic impulse/burst noise have been detected, as shown in step 1302. Advantageously, the detection of ingress after the detection of CPD and PIB reduces the likelihood that frequencies having CPD and/or time-slots having burst noise are improperly classified as having ingress. In operation, the described exemplary detection system performs an in-band FFT, as shown in step 1304 on the incoming stream, preferably during a period when the central controller is not receiving an upstream signal and when no periodic impulse/burst noise is expected. The described exemplary detection system analyzes the energy/power level of the incoming stream, as shown in step 1306.

Since periodic impulse/burst noise or random impulse/burst noise have wide spectral characteristics, if more than a predetermined number of bins are above a predetermined threshold, the described exemplary detection system classifies the bin as a random impulse/burst noise event, as shown in step 1310, and recaptures ingress in a different time interval. For additional robustness, the described exemplary detection system also correlates the received signal with the predicted in-band CPD tones to ensure that none of the detected ingress tones are due to CPD.

When an FFT capture is free of impulse/burst noise, the detection system tabulates frequency bins where ingress is detected (energy above a predetermined threshold) as shown at step 1312. The described exemplary detection system interfaces with the scheduler 218 and system manager 222 to schedule in-band time domain captures at a reduced sampling rate and increased record length to begin characterizing the time domain characteristics (on/off times) of the ingress, as shown in step 1314.

The described exemplary embodiment preferably begins with the ingress that has the highest energy level and/or the highest bandwidth. In an embodiment, the detection system utilizes contiguous frequency bins in the FFT at similar energy levels to locate the ingress with the highest energy level and/or the highest bandwidth. The detection system sums the total energy and total bandwidth in contiguous frequency bins above a predetermined threshold.

The described exemplary detection system performs envelope detection, as shown in step 1316, of the time domain captures to produce a baseband waveform of the ingress that provides power as a function of time, on/off intervals, etc. The detection system then converts the sampled stream into DC waveforms, as shown in step 1318, using, for example, envelope detection of power, or any one of a number of techniques known to those skilled in the art for converting an RF stream into a DC pulsed waveform.

The described exemplary detection system uses a conversion process that maintains the power versus time characteristic so that power fluctuations are observed. An exemplary detection system calculates the rising and falling edges from the DC pulse waveform and then calculates pulse widths as well as the time between pulses. In addition, an exemplary detection system calculates power fluctuations within pulses and between pulses. The described exemplary system further processes the pulse data to identify minimum and maximum pulse width, minimum and maximum time between pulses, and power fluctuation. An exemplary detection system repeats the process for each ingress frequency discovered in band. The detection system preferably reports the overall minimum and maximum pulse width, minimum and maximum time between pulses and power fluctuation to the system manager 222, as shown in step 1320, for adaptation and ICF update rate specification, as shown in step 1322.

IV. CONCLUSION

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for maintaining the integrity of a communication system, comprising:

detecting an impairment on a communication channel of the communication system;

characterizing said impairment as one of a plurality of impairment types, wherein said plurality of impairment types includes at least one non-periodic impairment type and one periodic impairment type; and adapting operating parameters of the communication system in accordance with said characterization of said impairment.

2. The method of claim 1, wherein said detecting comprises:

performing a time domain to frequency domain conversion on a signal associated with the communication channel;

aggregating a signal magnitude in the frequency domain;

comparing said signal magnitude at a set of specified frequencies with threshold values each associated with a frequency from said set of specified frequencies; and reporting a list of frequencies from said set of specified frequencies for which said signal magnitude of an individual frequency exceeds a threshold value associated with said individual frequency.

3. The method of claim 2, wherein said set of specified frequencies comprises 6 MHz, 12 MHz, 18 MHz, 24 MHz, 30 MHz, and 36 MHz.

4. The method of claim 3, wherein said set of specified frequencies further comprises 4.5 MHz, 7.5 MHz, 10.5 MHz, 13.5 MHz, 16.5 MHz, 19.5 MHz, 22.5 MHz, 25.5 MHz, 28.5 MHz, 31.5 MHz, 34.5 MHz, and 37.5 MHz.

5. The method of claim 1, wherein said detecting comprises:

performing a time domain to frequency domain conversion on a signal associated with the communication channel;

aggregating a signal magnitude in the frequency domain;

comparing said signal magnitude aggregated within specified frequency ranges with threshold values each associated with a frequency range from said specified frequency ranges; and reporting a list of frequency ranges from said specified frequency ranges for which the signal magnitude of an individual frequency range exceeds a threshold value associated with said individual frequency range.

6. The method of claim 1, wherein said detecting comprises:

performing a time domain to frequency domain conversion on a signal associated with the communication channel;

computing a pulse width and a time between pulses for said signal within one or more frequency ranges; and detecting a periodic signal within said one or more frequency ranges.

7. The method of claim 1, wherein said detecting comprises:

examining data packets from the communication channel;

determining whether said data packets contain data errors; and detecting a period with which data packets containing data errors arrive from the communication channel.

8. The method of claim 1, wherein said adapting operating parameters comprises scheduling data transmissions at a frequency without said impairment.

9. A system for maintaining the integrity of a communication system comprising:

an analog receiver that receives analog data from the communication system;

an analog-to-digital converter coupled to said analog receiver that converts said analog data into digitized data;

a fast Fourier transform (FFT) processor coupled to said analog-to-digital converter that receives said digitized data and performs a time domain to frequency domain conversion of said digitized data; and a processor coupled to said FFT processor that examines said converted digitized data to detect an impairment on a communication channel of the communication system and classify said impairment as one of a plurality of impairment types, wherein said plurality of impairment types includes at least one non-periodic impairment type and at least one periodic impairment type, and wherein said processor adapts operating parameters of the communication system in accordance with said characterization of said impairment.

10. The system of claim 9, wherein said processor detects said impairment by accumulating a magnitude of said digitized data over a period of time at one or more specified frequencies and examines said specified frequencies to determine whether a threshold has been exceeded.

11. The system of claim 10, wherein said specified frequencies comprise 6 MHz, 12 MHz, 18 MHz, 24 MHz, 30 MHz, and 36 MHz.

12. The system of claim 11, wherein said specified frequencies further comprise 4.5 MHz, 7.5 Mhz, 10.5 MHz, 13.5 MHz, 16.5 MHz, 19.5 MHz, 22.5 MHz, 25.5 MHz, 28.5 MHz, 31.5 MHz, 34.5 MHz, and 37.5 MHz.

13. The system of claim 9, wherein said processor detects said impairment by comparing a frequency spectrum comprising said digitized data with one or more stored frequency spectra.

14. The system of claim 9, wherein said processor detects said impairment by examining a frequency band of said digitized data, computes a pulse width and a time between pulses for a DC waveform in said frequency band, and tracks an impulse train from said DC waveform.

15. The system of claim 9, further comprising:

an upstream demodulator coupled to said analog-to-digital converter that demodulates said digitized data into demodulated data;

a media access controller coupled to said upstream demodulator that extracts data packets from said demodulated data; and a memory coupled to said media access controller that stores said data packets in said memory;

wherein said processor detects said impairment by examining said data packets stored in said memory to identify contiguous groups of data packets with errors and data packets without errors and computing a burst period for said contiguous groups of data packets with errors.

16. The system of claim 15, wherein said processor schedules outgoing transmissions to not coincide with said burst period.

17. The system of claim 9, wherein said processor schedules data transmissions at a frequency without said impairment.

18. An apparatus for maintaining the integrity of a communication system comprising:

receiving means for receiving analog data from the communication system;

converting means for converting said analog data into digitized data;

transforming means for transforming said digitized data from a time domain to a frequency domain; and processing means for examining said transformed digitized data to detect an impairment on a communication channel of the communication system and classify said impairment as one of a plurality of impairment types, wherein said plurality of impairment types includes at least one non-periodic impairment type and at least one periodic impairment type, and wherein said processing means adapts operating parameters of the communication system in accordance with said classification of said impairment.

19. The apparatus of claim 18, wherein said processing means detects said impairment by accumulating a magnitude of said digitized data over a period of time in one or more specified frequency ranges and examining said specified frequency ranges to determine whether a threshold has been exceeded.

20. The apparatus of claim 18, wherein said processing means detects said impairment by comparing a frequency spectrum comprising said digitized data with one or more frequency spectra.

21. The apparatus of claim 18, wherein said processing means detects said impairment by selecting a frequency band of said transformed data, computing a pulse width and a time between pulses for a DC waveform in said frequency band, and tracking an impulse train based on said pulse width and said time between pulses.

22. The apparatus of claim 18, further comprising:

demodulating means for demodulating said digitized data into demodulated data;

extracting means for extracting data packets from said demodulated data; and storing means for storing said data packets;

wherein said processor means detects said impairment by examining said data packets stored in said storing means to identify contiguous groups of data packets with errors and data packets without errors and computing a burst period for said contiguous groups of data packets with errors.

23. The apparatus of claim 22, wherein said processing means schedules outgoing transmissions to not coincide with said burst period.

24. The apparatus of claim 18, wherein said processing means schedules data transmissions at a frequency without said impairment.

* * * * *